(12) United States Patent
Kim et al.

(10) Patent No.: US 10,001,873 B2
(45) Date of Patent: Jun. 19, 2018

(54) DISPLAY APPARATUS AND DRIVING METHOD THEREOF

(71) Applicant: SAMSUNG DISPLAY CO., LTD., Yongin-si, Gyeonggi-Do (KR)

(72) Inventors: Beomshik Kim, Yongin-si (KR); Dohyung Ryu, Yongin-si (KR); Jongseo Lee, Yongin-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 134 days.

(21) Appl. No.: 15/236,839

(22) Filed: Aug. 15, 2016

(65) Prior Publication Data

US 2017/0199616 A1    Jul. 13, 2017

(30) Foreign Application Priority Data

Jan. 8, 2016  (KR) ........................ 10-2016-0002784

(51) Int. Cl.
*G06F 3/045* (2006.01)
*G06F 3/041* (2006.01)
*G09G 3/3266* (2016.01)
*G09G 3/3225* (2016.01)

(52) U.S. Cl.
CPC .......... *G06F 3/0416* (2013.01); *G06F 3/0412* (2013.01); *G06F 3/0414* (2013.01); *G09G 3/3225* (2013.01); *G09G 3/3266* (2013.01); *G09G 2300/0426* (2013.01); *G09G 2300/0809* (2013.01)

(58) Field of Classification Search
CPC .... G06F 3/0416; G06F 3/0414; G06F 3/0412; G09G 3/3225; G09G 3/3266; G09G 2300/0426; G09G 2300/0809
See application file for complete search history.

(56) References Cited

U.S. PATENT DOCUMENTS 9,146,635 B2 *  9/2015  Nakagawa ............ G06F 3/0416
9,405,411 B2 *  8/2016  Kim ........................ G06F 3/044
9,576,536 B2 *  2/2017  Kwon .................. G09G 3/3291
(Continued)

FOREIGN PATENT DOCUMENTS

KR    10-2009-0009387    1/2009
KR    10-2010-0117854    11/2010
(Continued)

*Primary Examiner* — Rodney Amadiz
(74) *Attorney, Agent, or Firm* — F. Chau & Associates, LLC

(57) ABSTRACT

A display apparatus and driving method are provided. The display apparatus, which operates in a display mode or a sensing mode, includes: a first signal line configured to apply a first driving signal to a pixel circuit during the display mode and to apply a sensing input signal to the pixel circuit during the sensing mode; a second signal line configured to apply a second driving signal to the pixel circuit during the display mode and to transfer a sensing output signal from the pixel circuit during the sensing mode; and a pixel including the pixel circuit, wherein a first current path for image display is formed in the pixel circuit during the display mode, and a second current path, configured to measure a resistance of a pressure resistance layer between the first signal line and the second signal line, is formed in the pixel circuit during the sensing mode.

20 Claims, 17 Drawing Sheets

(56) References Cited

U.S. PATENT DOCUMENTS

| | | | |
|---|---|---|---|
| 9,733,755 B2* | 8/2017 | Yang | G06F 3/0416 |
| 2007/0285365 A1* | 12/2007 | Lee | G06F 3/0412 |
| | | | 345/87 |
| 2010/0271327 A1 | 10/2010 | Shin et al. | |
| 2011/0226069 A1 | 9/2011 | Kim et al. | |
| 2014/0160061 A1 | 6/2014 | Kim et al. | |
| 2014/0347284 A1 | 11/2014 | Lee et al. | |
| 2016/0267844 A1* | 9/2016 | Senda | G09G 3/3233 |
| 2017/0061877 A1* | 3/2017 | Lee | G09G 3/3233 |

FOREIGN PATENT DOCUMENTS

| | | |
|---|---|---|
| KR | 10-2014-0074453 | 6/2014 |
| KR | 10-2014-0139261 | 12/2014 |

\* cited by examiner

DISPLAY APPARATUS AND DRIVING METHOD THEREOF

CROSS-REFERENCE TO RELATED APPLICATION

This application claims priority under 35 U.S.C. §119(a) to Korean Patent Application No. 10-2016-0002784, filed on Jan. 8, 2016, in the Korean Intellectual Property Office, the disclosure of which is incorporated by reference in its entirety herein.

TECHNICAL FIELD

Exemplary embodiments relate to a display apparatus and a driving method thereof.

DISCUSSION OF RELATED ART

A display apparatus may include not only a function of displaying an image but also a touch sensing function allowing interaction with a user. In the case where a user writes a letter or draws a picture by touching a screen with his finger, a touch pen, etc., the touch sensing function detects touch information, such as whether an object touches the screen, and a touch location, by detecting change of a pressure, a charge, light, etc. applied to the screen by the display apparatus.

To implement such a touch sensing function, a pressure sensor is typically used together with a capacitive touch sensor, and research into a method of embedding the pressure sensor inside a panel is in active progress.

Additionally, there has been a recent increase in demand for an organic light-emitting display apparatus having a high resolution while minimizing manufacturing costs.

SUMMARY

One or more embodiments include a display apparatus and a driving method thereof which may perform, at low cost, an image display function and a pressure sensing function in the display apparatus while providing high resolution.

Additional aspects, in part, will be set forth in the description which follows, will be apparent from the description, or may be learned by practice of the presented embodiments.

According to one or more embodiments, a display apparatus operating in a display mode or a sensing mode includes: a first signal line configured to apply a first driving signal to a pixel circuit during the display mode and to apply a sensing input signal to the pixel circuit during the sensing mode; a second signal line configured to apply a second driving signal to the pixel circuit during the display mode and to transmit a sensing output signal generated from the pixel circuit during the sensing mode; and a pixel including the pixel circuit, wherein a first current path for image display is formed in the pixel circuit during the display mode, and a second current path, configured to measure a resistance of a pressure resistance layer between the first signal line and the second signal line, is formed in the pixel circuit during the sensing mode.

The pressure resistance layer may include polysilicon.

The first signal line may include one of an initialization line, configured to apply a signal initializing a gate electrode of a transistor of the pixel circuit, and a data line, configured to apply a data signal to the pixel circuit during the display mode, and the second signal line may include the other of the initialization line and the data line.

The pixel circuit may include: a first transistor connected to the first signal line and a first scan line; and a second transistor connected to the second signal line and a second scan line. The first transistor and the second transistor may be turned on by a scan signal applied to both the first scan line and the second scan line, such that the second current path may be formed between the first signal line and the second signal line during the sensing mode.

The first transistor may include: a first gate electrode connected to the first scan line, a first electrode connected to the first signal line, a second electrode connected to a first node, and a first pressure resistance layer connected to the first electrode and the second electrode; and the second transistor may include: a second gate electrode connected to the second scan line, a third electrode connected to the second signal line, a fourth electrode connected to the first node, and a second pressure resistance layer connected to the third electrode and the fourth electrode.

The pixel circuit may further include: a third transistor connected between one node of the second current path and a capacitor storing a voltage corresponding to a data signal. The third transistor is turned on during the display mode and turned off during the sensing mode.

The pixel circuit may further include: at least one transistor connected to the first scan line or the second scan line and connected between the first transistor and the second transistor, and the at least one transistor may be turned on with the first transistor and the second transistor by the scan signal applied to the first scan line and the second scan line, such that the second current path may be formed between the first signal line and the second signal line during the sensing mode.

The first transistor may include: a first gate electrode connected to the first scan line, a first electrode connected to the first signal line, a second electrode connected to a first node, and a first pressure resistance layer connected to the first electrode and the second electrode, the second transistor may include: a second gate electrode connected to the second scan line, a third electrode connected to the second signal line, a fourth electrode connected to a second node, and a second pressure resistance layer connected to the third electrode and the fourth electrode, and the at least one transistor connected between the first transistor and the second transistor may include a third transistor and a fourth transistor. The third transistor may include a third gate electrode connected to the first node, a fifth electrode connected to the second node, a sixth electrode, and a third pressure resistance layer connected to the fifth electrode and the sixth electrode; and the fourth transistor may include: a fourth gate electrode connected to the first scan line, a seventh electrode connected to the third gate electrode of the third transistor, a eighth electrode connected to the sixth electrode of the third transistor, and a fourth pressure resistance layer connected to the seventh electrode and the eighth electrode.

The sensing mode of the display apparatus may be performed during a blank section of one frame.

Each of the display mode and the sensing mode may be performed in one of an even-numbered frame and an odd-numbered frame, and the display mode and the sensing mode may alternate.

The apparatus may further include: a scan driver configured to apply a scan signal to a scan line connected to the pixel circuit during the display mode and the sensing mode; a panel driving and output unit configured to apply the first driving signal to the first signal line during the display mode and to apply the sensing input signal to the first signal line during the sensing mode; and a panel driving and sensing unit configured to apply the second driving signal to the second signal line during the display mode, to read out the sensing output signal from the second signal line during the sensing mode, and to measure a resistance change of the pressure resistance layer during the sensing mode.

The scan driver may include: a first scan driver configured to apply the scan signal to the scan line during the display mode; and the second scan driver configured to apply a scan signal to the scan line during the sensing mode.

The first signal line may include an initialization line applying an initialization signal, and the second signal line may include a data line applying a data signal, the panel driving and output unit may include a first switching unit configured to connect the initialization line to a first input line supplying the initialization signal during the display mode, and to connect the initialization line to a second input line supplying the sensing input signal during the sensing mode, and the panel driving and sensing unit may include: a data driver supplying the data signal to the data line during the display mode; a sensing unit reading out the sensing output signal via the data line during the sensing mode; and a second switching unit selectively connecting the data line to the data driver and the sensing unit, depending on a driving mode.

The first signal line may include a data line applying a data signal, and the second signal line may include an initialization line applying an initialization signal, the panel driving and output unit may include: a data driver configured to supply the data signal to the data line during the display mode; and a first switching unit configured to connect the data line to the data driver during the display mode and to connect the data line to a first input line supplying the sensing input signal during the sending mode; and the panel driving and sensing unit may include: a sensing unit reading out the sensing output signal via the initialization line during the sensing mode; and a second switching unit configured to connect the initialization line to a second input line supplying the initialization signal during the display mode, and to connect the initialization line to the sensing unit during the sensing mode.

The scan driver may simultaneously apply scan signals every N scan lines, N being greater than or equal to two.

According to one or more embodiments, a method of driving a display apparatus including a plurality of pixels, each of the pixels having a pixel circuit and a pressure resistance layer, the method includes: receiving a scan signal; receiving a data signal during a display mode; emitting light by using a driving current during the display mode; receiving a sensing input signal during a sensing mode; and generating a sensing output signal during the sensing mode. The driving current corresponds to the data signal and flows along a first current path formed in the pixel circuit during the display mode, and the sensing output signal corresponds to a resistance of the pressure resistance layer and flows along a second current path formed between a pair of signal lines connected to the pixel circuit during the sensing mode.

The method may further include: receiving the sensing output signal at a sensing unit; and measuring a resistance change of the pressure resistance layer from the sensing output signal.

Scan signals may be simultaneously applied to pixels arranged in a plurality of rows during the sensing mode, each row of pixels having a common scan line.

The sensing mode of the method may be performed during a blank section of one frame.

Each of the display mode and the sensing mode may be performed in one of an even-numbered frame and an odd-numbered frame, and the display mode and the sensing mode may alternate.

Exemplary embodiments may provide a display apparatus of high resolution that may perform a display function and a sensing function in parallel at low cost.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
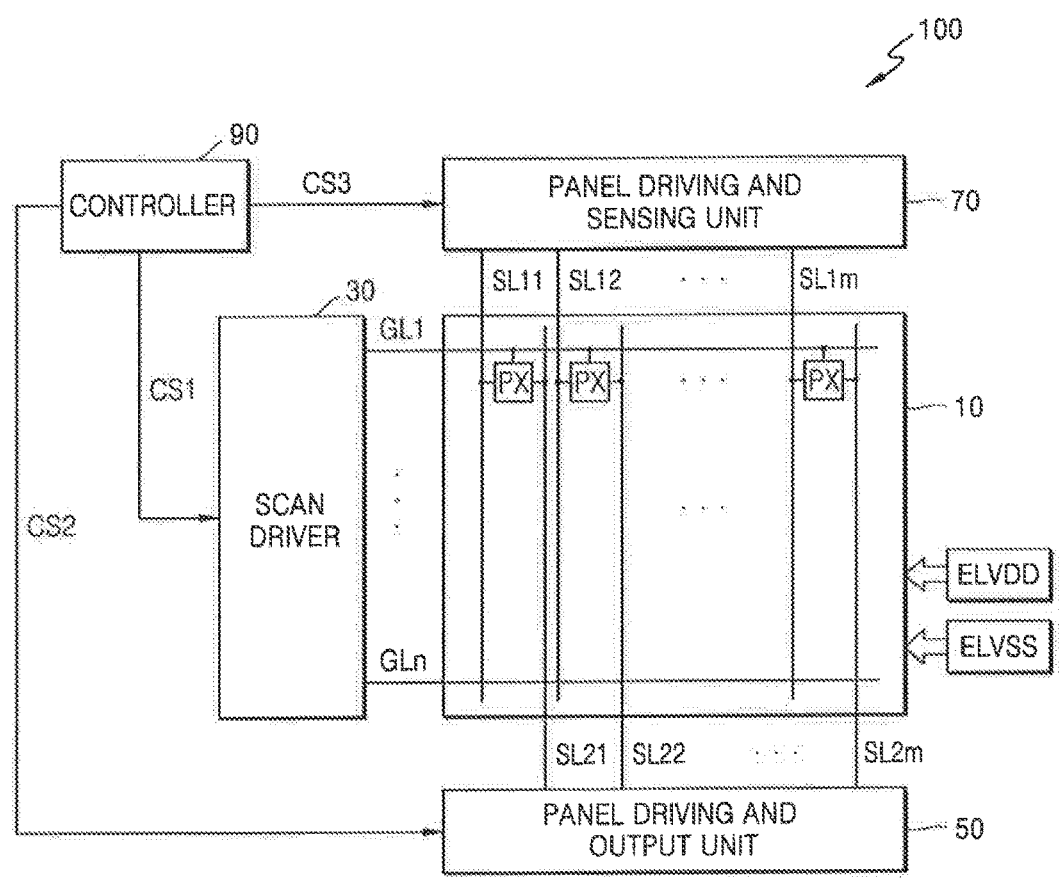
FIG. 1 is a block diagram illustrating a display apparatus according to an embodiment.

As the inventive concept allows for various changes and numerous embodiments, exemplary embodiments will be illustrated in the drawings and described in detail in the written description. Effects and characteristics of present exemplary embodiments, and a method of accomplishing them will be apparent by referring to content described below in detail together with the drawings. However, embodiments of the inventive concept are not limited to the exemplary embodiments below discussed below and may be implemented in various forms.

Hereinafter, the embodiments are described with reference to the accompanying drawings. When a description is made with reference to the drawings, like reference numerals are used for like or corresponding components and repeated descriptions thereof are omitted.

It will be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

It will be understood that when a certain portion is referred to as being "connected" to another portion, it may be "directly connected" to the other portion, or may be "electrically connected" to the other portion with another component interposed therebetween.

FIG. 1 is a block diagram illustrating a display apparatus according to an embodiment.

Referring to FIG. 1, the display apparatus 100 includes a pixel unit 10, a scan driver 30, a panel driving and output unit 50, a panel driving and sensing unit 70, and a controller 90. The display apparatus 100 may be an organic light-emitting display apparatus.

In the pixel unit 10, a plurality of pixels PX are arranged in a matrix configuration along rows and columns. A pixel PX is connected to a scan line GL, a signal line SL, and a power source applying a first power voltage ELVDD and a second power voltage ELVSS. The pixel PX may include a pixel circuit and a light-emitting device. The pixel PX may be driven in a display mode that displays an image by emitting light via the light-emitting device, and a sensing mode that detects external pressurization. For example, the pixel PX may be driven in time division by separating the display mode from the sensing mode by one frame. For another example, the pixel PX may be driven in time division by separating the display mode from the sensing mode in odd and even-numbered frame shifts. The pixel PX may emit light depending on a driving current corresponding to a data signal formed in the pixel circuit during the display mode, and operate as a pressure sensor via some circuit components, including a pressure resistance layer inside the pixel circuit, during the sensing mode.

In the pixel unit 10, a plurality of scan lines GL1 to GLn connected to the scan driver 30, a plurality of first signal lines SL11 to SL1m connected to the panel driving and sensing unit 70, and a plurality of second signal lines SL21 to SL2m connected to the panel driving and output unit 50 are arranged along rows or columns. In the pixel unit 10, a power line for applying the first power voltage ELVDD and/or the second power voltage ELVSS to the pixels PX may be disposed in a mesh configuration. The plurality of scan lines GL1 to GLn are spaced apart constantly and extend in a row direction, and each scan line is connected to pixels PX arranged in the same row. The plurality of first signal lines SL11 to SL1m and the plurality of second signal lines SL21 to SL2m are spaced apart constantly and extend in a column direction, and each signal line is connected to pixels PX arranged in the same column. However, the embodiment is not limited thereto; for example, the plurality of first signal lines SL11 to SL1m and/or the plurality of second signal lines SL21 to SL2m may be spaced apart and extend in the row direction, and each signal line may be connected to pixels PX arranged in the same row. Though not shown, a plurality of emission control lines transferring an emission control signal to a pixel PX and other signal lines may be further disposed in the pixel unit 10.

According to an embodiment, the plurality of first signal lines SL11 to SL1m may be a plurality of data lines DL1 to DLm (see FIG. 5) transferring a data signal, and the plurality of second signal lines SL21 to SL2m may be a plurality of initialization lines IL1 to ILm (see FIG. 5) transferring an initialization signal. Additionally, the plurality of first signal lines SL11 to SL1m may be a plurality of initialization lines IL1 to ILm (see FIG. 9) and the plurality of second signal lines SL21 to SL2m may be a plurality of data lines DL1 to DLm (see FIG. 9).

The scan driver 30, connected to the plurality of scan lines GL1 to GLn of the pixel unit 10, applies a scan signal to a scan line in response to a first control signal CS1, and a transistor of a pixel PX connected to the scan line is turned on. The scan driver 30 sequentially applies scan signals to the pixel unit 10 during the display mode and the sensing mode. The scan driver 30 may simultaneously apply scan signals to one or more scan lines during the sensing mode.

The panel driving and output unit 50 is connected to the plurality of second signal lines SL21 to SL2m of the pixel unit 10. The panel driving and output unit 50 supplies a second driving signal to the plurality of second signal lines SL21 to SL2m during the display mode, and supplies a sensing input signal to the plurality of second signal lines SL21 to SL2m during the sensing mode. The panel driving and output unit 50 may supply a sensing input signal to at least one second signal line from among the plurality of second signal lines SL21 to SL2m, for example, the second signal lines SL21 to SL2m disposed in a partial region of the pixel unit 10.

The panel driving and sensing unit 70 is connected to the plurality of first signal lines SL11 to SL1m of the pixel unit 10. The panel driving and sensing unit 70 may supply a first driving signal to the plurality of first signal lines SL11 to SL1m during the display mode, and may read out a sensing output signal from the pixel unit 10 via the plurality of first signal lines SL11 to SL1m during the sensing mode. The panel driving and sensing unit 70 may read out a sensing output signal via at least one first signal line from among the plurality of first signal lines SL11 to SL1m, for example, the first signal lines SL11 to SL1m disposed in a partial region of the pixel unit 10. A sensing output signal may be a signal that detects resistance change of a pressure sensor by external pressurization and a touch on the display apparatus 100, transformation of the display apparatus 100, etc.

The controller 90 receives input image data and an input control signal from an external graphics controller (not shown). The input control signal includes, for example, a vertical synchronization signal Vsync, a horizontal synchronization signal Hsync, and a main clock MCLK. The controller 90 may generate a data signal and first to third control signals CS1, CS2, and CS3 based on an input control signal. The controller 90 generates the first control signal CS1 and transfers the first control signal CS1 to the scan driver 30. The controller 90 generates the second control signal CS2 and transfers the same to the panel driving and output unit 50. The controller 90 generates the third control signal CS3 and transfers the same to the panel driving and sensing unit 70.

The controller 90 may determine a driving mode and control switching between the display mode and the sensing mode of the scan driver 30, the panel driving and output unit 50, and the panel driving and sensing unit 70. The controller 90 may control a number of scan lines to which the scan driver 30 will simultaneously supply scan signals during the sensing mode. The controller 90 may divide the pixel unit 10 into a plurality of regions, control the panel driving and output unit 50 to supply a sensing input signal to only at least one region from among the plurality of regions during the sensing mode, and control the panel driving and sensing unit 70 to read out a sensing output signal from only at least one region from among the plurality of regions.

The scan driver 30, the panel driving and output unit 50, the panel driving and sensing unit 70, and the controller 90 may be formed as separate integrated circuit chips or formed as one integrated circuit chip, such that the pixel unit 10 may be directly mounted above a formed substrate, mounted above a flexible printed circuit film, attached above a substrate in the form of a tape carrier package (TCP), or directly formed in the substrate, etc.

Figure 2:
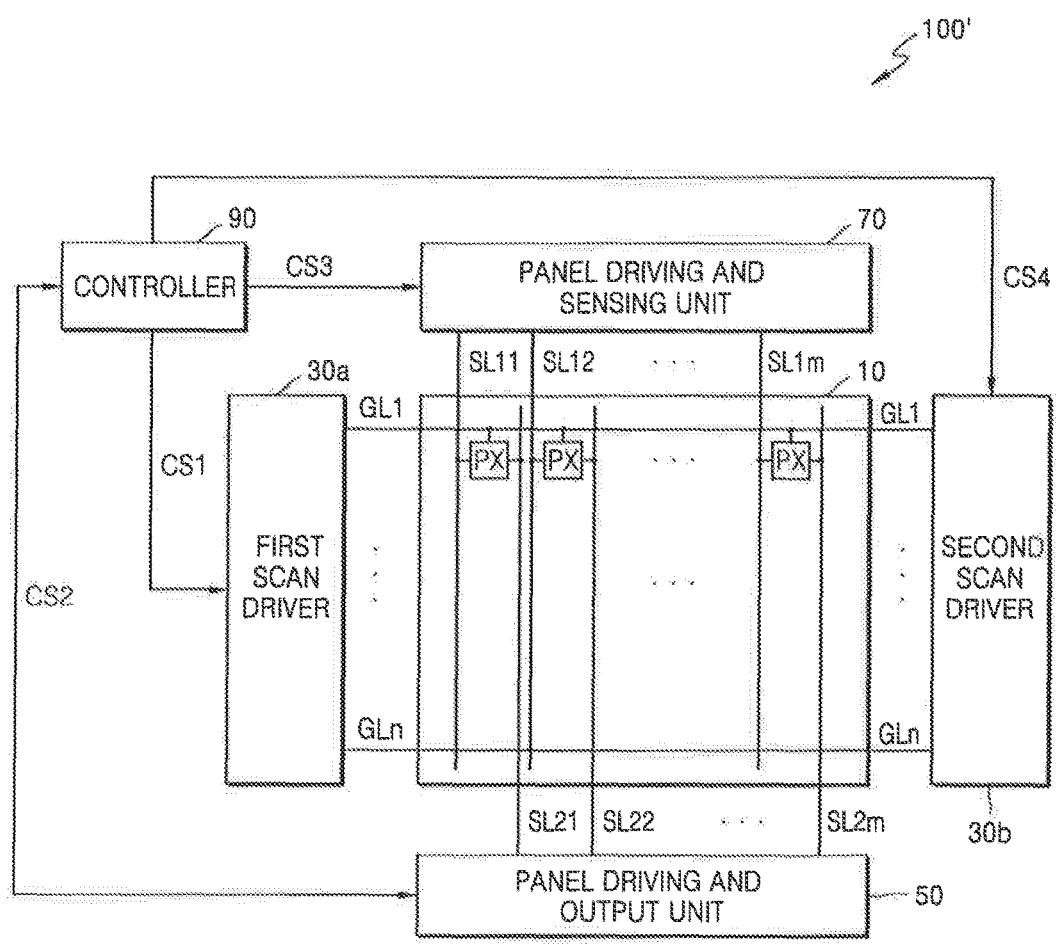
FIG. 2 is a block diagram illustrating a display apparatus according to another embodiment.

FIG. 2 is a block diagram illustrating a display apparatus 100' according to an exemplary embodiment.

The display apparatus 100' illustrated in FIG. 2 is different from the display apparatus 100 illustrated in FIG. 1 in that a first scan driver 30a operating during the display mode and a second scan driver 30b operating during the sensing mode are provided separately. Since the other components are substantially the same as those of the display apparatus 100 illustrated in FIG. 1, descriptions thereof are omitted.

The first scan driver 30a is connected to the plurality of scan lines GL1 to GLn of the pixel unit 10. During the display mode, the first scan driver 30a applies a scan signal to a scan line in response to a first control signal CS1, and a transistor of a pixel PX connected to the scan line is turned on. The first scan driver 30a may sequentially apply scan signals to the pixel unit 10 during the display mode.

The second scan driver 30b is connected to the plurality of scan lines GL1 to GLn of the pixel unit 10. During the sensing mode, the second scan driver 30b applies a scan signal to a scan line in response to a fourth control signal CS4, and a transistor of a pixel PX connected to the scan line is turned on. The second scan driver 30b may sequentially apply scan signals to the pixel unit 10 during the sensing mode. In this case, scan signals may be simultaneously applied to one or more scan lines.

Figure 3:
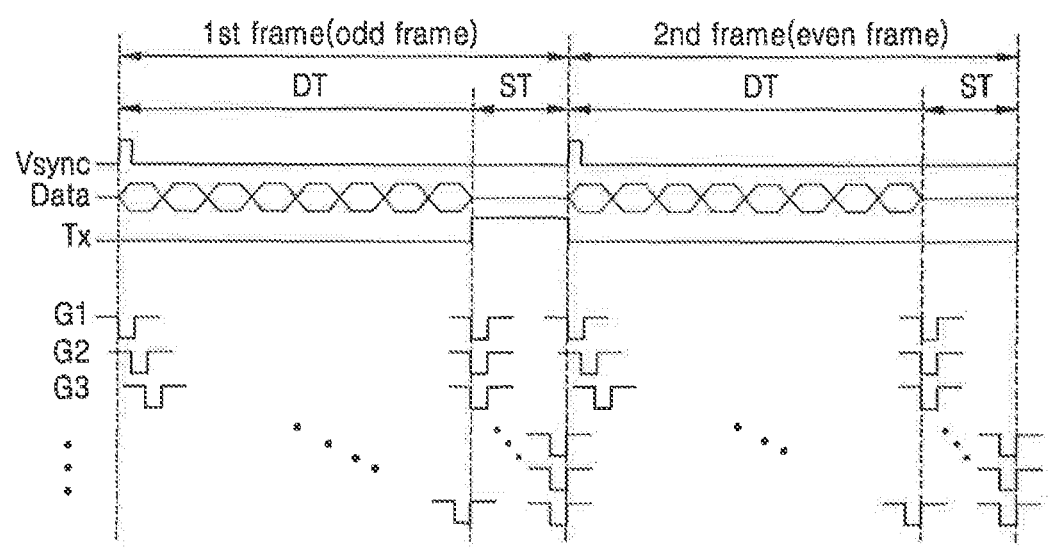
FIGS. 3 and 4 are diagrams illustrating a driving timing of a pixel illustrated in FIGS. 1 and 2.
Figure 4:
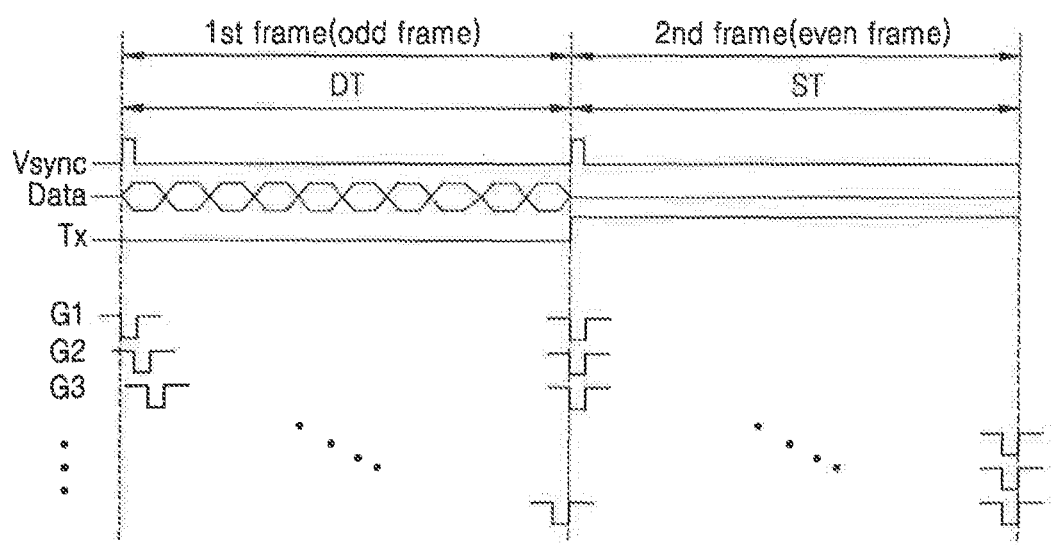

FIGS. 3 and 4 are diagrams illustrating a driving timing of a pixel illustrated in FIGS. 1 and 2.

A predetermined duration—after a scan signal is applied to a last scan line of one frame and data is output, and before a scan signal is applied to a first scan line of the next frame and data is output—is referred to as a blank section, and the remaining duration is referred to as an active section. The blank section may be located in front of or in the rear of the active section.

According to an embodiment, as illustrated in FIG. 3, a pixel PX may operate in the sensing mode during a blank section of one frame. In particular, the pixel PX may operate in the display mode during an active section, e.g., the display section DT of one frame, and may operate in the sensing mode during a blank section, e.g., a sensing section ST subsequent to the display section DT. However, the embodiment is not limited thereto, and the sensing section ST may be located in front of the display section DT of one frame.

During the display section DT, a data signal Data and scan signals G1 to Gn are synchronized with a vertical synchronization signal Vsync, and the scan signals G1 to Gn are sequentially output from a first line to an n-th line.

During the sensing section ST, a data signal Data is not applied to a pixel PX, and a sensing output signal Tx is applied to the pixel PX. The scan signals G1 to Gn are sequentially output from a first line to an n-th line. In this case, the scan signals may be simultaneously applied to a plurality of lines. According to the embodiment illustrated in FIG. 3, scan signals are simultaneously applied every three lines. A sensing time of a sensing section may be sufficiently secured by simultaneously driving a plurality of scan lines in a group.

According to an embodiment, as illustrated in FIG. 4, a pixel PX may operate in the display mode during a display section DT, and operate in the sensing mode during a sensing section ST on a one frame basis. For example, a pixel PX may operate in the display mode during an odd-numbered frame, and operate in the sensing mode during an even-numbered frame. Alternatively, a pixel PX may operate in the sensing mode during an odd-numbered frame, and operate in the display mode during an even-numbered frame.

During the display section DT, a data signal Data and scan signals G1 to Gn are synchronized with a vertical synchronization signal Vsync, and the scan signals G1 to Gn are sequentially output from a first line to an n-th line.

During the sensing section ST, a data signal Data is not applied to a pixel PX, and a sensing output signal Tx is applied to the pixel PX. The scan signals G1 to Gn are sequentially output from a first line to an n-th line. In this case, the scan signals may be simultaneously applied to a plurality of lines. According to an embodiment illustrated in FIG. 4, scan signals are simultaneously applied every three lines.

Figure 5:
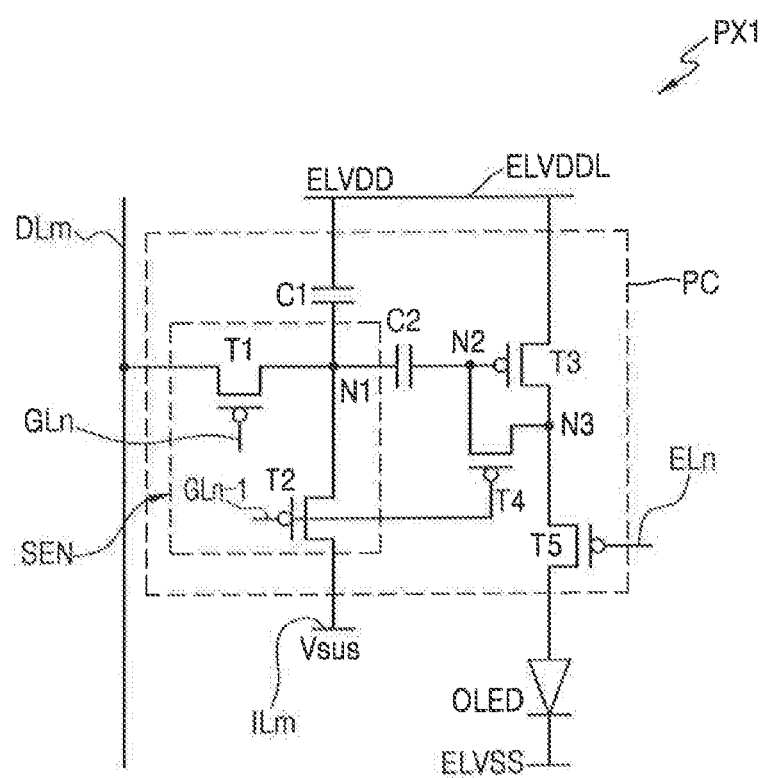
FIG. 5 is a circuit diagram illustrating an example of a pixel according to an embodiment.

FIG. 5 is a circuit diagram illustrating an example of a pixel according to an embodiment.

FIG. 5 illustrates a pixel PX1 connected to an n-th scan line GLn and an m-th data line DLm, for convenience of description.

Referring to FIG. 5, the pixel PX1 according to an embodiment includes a pixel circuit PC and a light-emitting device (OLED).

The OLED includes a first electrode connected to the pixel circuit PC and a second electrode connected to a power source supplying a second power voltage ELVSS. The OLED emits light at a predetermined brightness in response to a driving current supplied from the pixel circuit PC.

The pixel circuit PC includes first to fifth transistors T1 to T5 and first and second capacitors C1 and C2.

A first transistor T1 includes a gate electrode connected to a first scan line GLn, which is a scan line corresponding to an n-th pixel row, a first electrode connected to a data line DLm, and a second electrode connected to a first node N1.

A second transistor T2 includes a gate electrode connected to a second scan line GLn−1, which is a scan line corresponding to an (n−1)-th pixel row before an n-th pixel row, a first electrode connected to an initialization line ILm transferring an initialization signal Vsus, and a second electrode connected to the first node N1.

The data line DLm may be a first signal line SL1, and the initialization line ILm may be a second signal line SL2. Alternatively, the data line DLm may be the second signal line SL2, and the initialization line ILm may be the first signal line SL1.

A third transistor T3 includes a gate electrode connected to a second node N2, a first electrode connected to a power line ELVDDL transferring a first power voltage ELVDD, and a second electrode connected to a third node N3. The second electrode of the third transistor T3 is connected to the first electrode of the OLED via a fifth transistor T5.

A fourth transistor T4 includes a gate electrode connected to a second scan line GLn−1, a first electrode connected to the second electrode of the third transistor T3, and a second electrode connected to the gate electrode of the third transistor T3.

The fifth transistor T5 includes a gate electrode connected to an emission control line ELn, a first electrode connected to the second electrode of the third transistor T3, and a second electrode connected to the first electrode of the OLED.

A first capacitor C1 is connected between the first node N1 and the power line ELVDDL. The first capacitor C1 is charged with a voltage corresponding to a data signal.

A second capacitor C2 is connected between the first node N1 and the second node N2. The second capacitor C2 is charged with a voltage corresponding to a threshold voltage of the third transistor T3.

During the display mode, the pixel circuit PC generates a driving current for light emission of the OLED via operation of the first to fifth transistors T1 to T5 and the first and second capacitors C1 and C2. During the sensing mode, the pixel circuit PC operates as a pressure sensor SEN, which includes the first transistor T1 and the second transistor T2, connected between a pair of signal lines, for example, the initialization line ILm and the data line DLm.

Figure 6:
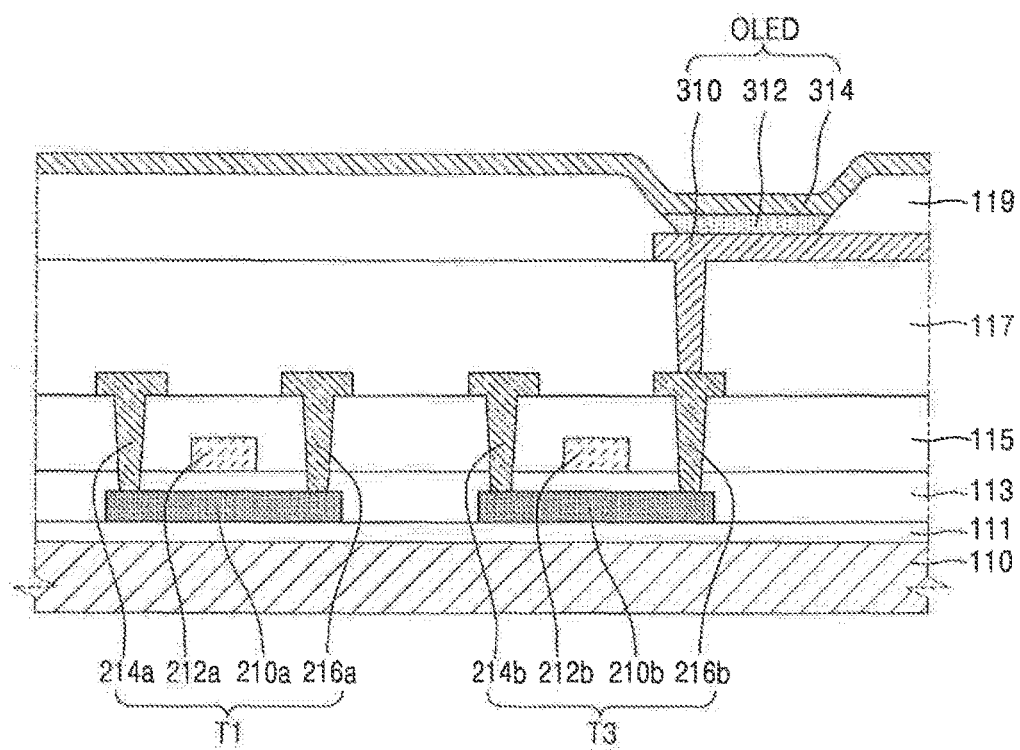
FIG. 6 is a cross-sectional view illustrating a portion of a pixel according to an embodiment.

FIG. 6 is a cross-sectional view illustrating a portion of a pixel according to an embodiment.

FIG. 6 illustrates that the first transistor T1, the third transistor T3, and the OLED of the pixel PX1 (illustrated in FIG. 5) are formed above a substrate 110.

The first transistor T1 includes an active layer 210a, a gate electrode 212a, a first electrode 214a, and a second electrode 216a. The first electrode 214a and the second electrode 216a are connected to a source region and a drain region of the active layer 210a, respectively.

The third transistor T3 includes an active layer 210b, a gate electrode 212b, a first electrode 214b, and a second electrode 216b. The first electrode 214b and the second electrode 216b are connected to a source region and a drain region of the active layer 210b, respectively.

The active layers 210a and 210b are disposed above a buffer layer 111. The active layers 210 and 210b include polysilicon, and include a pressure resistance layer whose resistance changes depending on pressurization.

A first insulating layer 113 is disposed between the active layers 210a and 210b and the gate electrodes 212a and 212b. A second insulating layer 115 is disposed between the gate electrodes 212a and 212b, the first electrodes 214a and 214b, and the second electrodes 216a and 216b. A third insulating layer 117 is disposed above the first electrodes 214a and 214b and the second electrodes 216a and 216b.

The OLED is disposed above the third insulating layer 117, and includes a first electrode 310 connected to the second electrode 216b of the third transistor T3, a second electrode 314 facing the first electrode 310, and an organic layer 312 between the first electrode 310 and the second electrode 314. The organic layer 312 includes an organic emission layer.

As the resolution of a display apparatus increases, components for configuring the pixel circuit and wirings connected to the pixel circuit increase. Accordingly, the space for inserting a separate touch sensor, pressure sensor, etc. into the pixel unit 10 is insufficient.

According to an embodiment, the first to fifth transistors T1 to T5 are low temperature polysilicon (LTPS) transistors in which an active layer includes polysilicon having a pressure resistance characteristic. Therefore, a current path is formed in which a sensing current is generated in the pixel circuit PC by using at least one of the first to fifth transistors T1 to T5, allowing the pixel circuit PC to perform sensing mode driving independently of display mode driving. The current path in which the sensing current is generated in the pixel circuit PC is different from a current path in which the driving current is generated in the pixel circuit PC.

Figure 7:
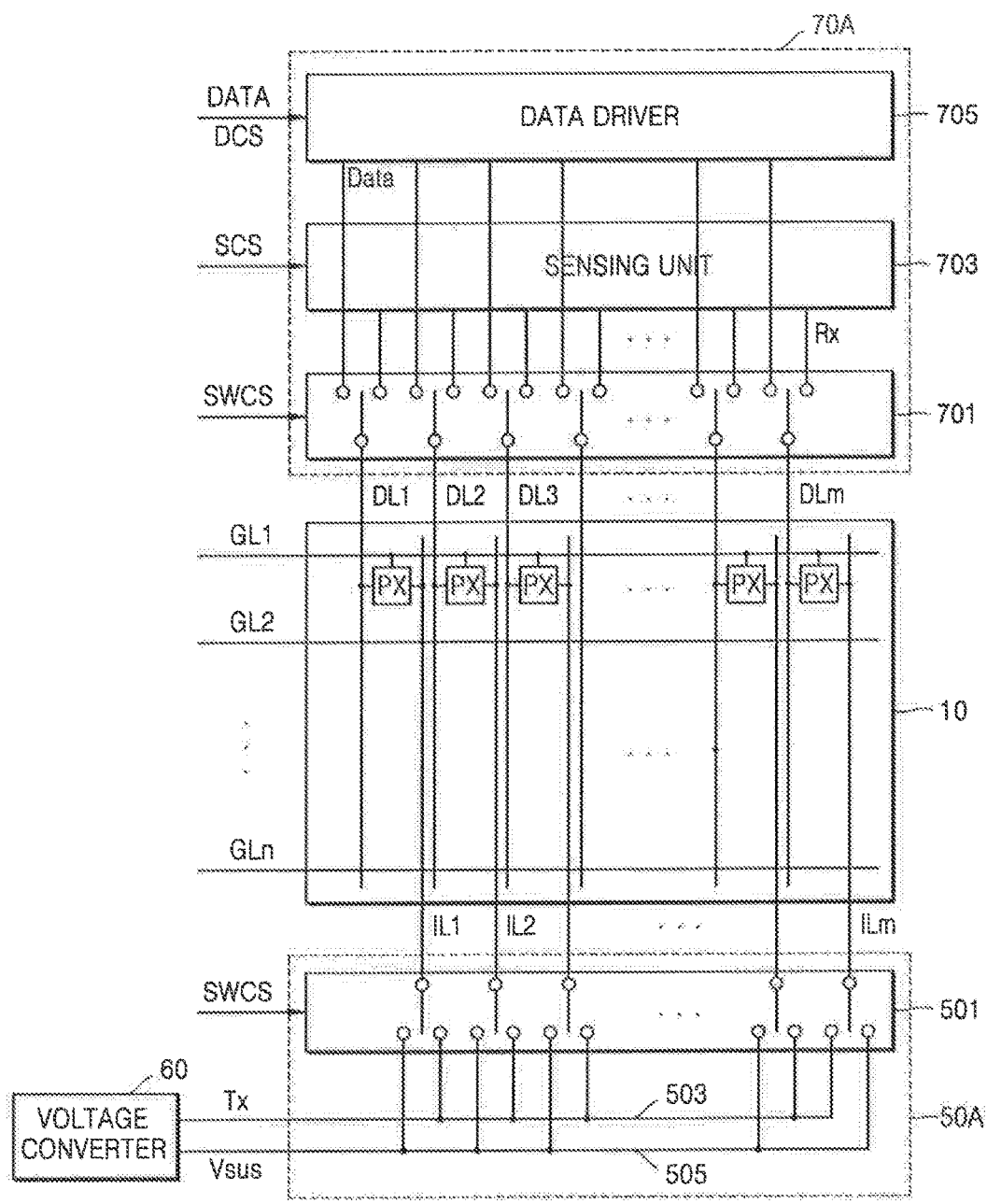
FIG. 7 is a block diagram illustrating an example of a panel driving and output unit and a panel driving and sensing unit illustrated in FIG. 1.

FIG. 7 is a block diagram illustrating an example of a panel driving and output unit and a panel driving and sensing unit illustrated in FIG. 1.

According to an embodiment of FIG. 7, the plurality of first signal lines SL11 to SL1m, illustrated in FIG. 1, are a plurality of data lines DL1 to DLm that transfer a data signal Data, and the plurality of second signal lines SL21 to SL2m are a plurality of initialization lines IL1 to ILm that transfer an initialization signal VSUS.

A panel driving and output unit 50A includes a first switching unit 501, a first input line 503 transferring a sensing input signal Tx, and a second input line 505 transferring an initialization signal Vsus.

The first switching unit 501 includes a plurality of switches selectively connecting the plurality of initialization lines IL1 to ILm to the first input line 503 and the second input line 505. Each switch may be implemented by using at least one transistor. The first switching unit 501 may individually control each switch by using a switch control signal SWCS, included in a second control signal CS2, from the controller 90. The first switching unit 501 connects the plurality of initialization lines IL1 to ILm to the second input line 505 during the display mode, and connects the plurality of initialization lines IL1 to ILm to the first input line 503 during the sensing mode. During the sensing mode, the first switching unit 501 may connect only some of the plurality of initialization lines IL1 to ILm to the first input line 503.

During the sensing mode, the first input line 503 is connected to the plurality of initialization lines IL1 to ILm of the pixel unit 10 via the first switching unit 501. The first input line 503 applies a sensing input signal Tx to the plurality of initialization lines IL1 to ILm of the pixel unit 10.

During the display mode, the second input line 505 is connected to the plurality of initialization lines IL1 to ILm of the pixel unit 10 via the first switching unit 501. The second input line 505 applies an initialization signal Vsus to the plurality of initialization lines IL1 to ILm of the pixel unit 10.

According to an exemplary embodiment, a sensing input signal Tx and an initialization signal Vsus may be supplied from a voltage converter 60. The voltage converter 60 may be provided in the controller 90. However, the embodiment is not limited thereto, and the voltage converter 60 may be provided in the panel driving and output unit 50A. A sensing input signal Tx and an initialization signal Vsus may be voltages of the same level or voltages of different levels.

A panel driving and sensing unit 70A includes a second switching unit 701, a sensing unit 703, and a data driver 705.

The second switching unit 701 includes a plurality of switches selectively connecting the plurality of data lines DL1 to DLm to the sensing unit 703 and the data driver 705. Each switch may be implemented by using at least one transistor. The second switching unit 701 may individually control each switch by using a switch control signal SWCS, included in a third control signal CS3, from the controller 90. The second switching unit 701 connects the plurality of data lines DL1 to DLm to the data driver 705 during the display mode, and connects the plurality of data lines DL1 to DLm to the sensing unit 703 during the sensing mode. During the sensing mode, the second switching unit 701 may connect only some of the plurality of data lines DL1 to DLm to the sensing unit 703.

The sensing unit 703 is connected to the plurality of data lines DL1 to DLm of the pixel unit 10 via the second switching unit 701 during the sensing mode. The sensing unit 703 receives a sensing output signal Rx from the pixel unit 10 via the plurality of data lines DL1 to DLm. The sensing unit 703 is a circuit that detects a current flowing through a pixel PX when the pixel PX operates in the sensing mode in response to a sensing control signal SCS, included in the third control signal CS3, from the controller 90. A current sensed by the sensing unit 703 corresponds to a resistance value of a pressure resistance layer of a transistor disposed along a current path formed in the pixel PX. By measuring resistance change of a pressure resistance layer from a sensing output signal Rx, the sensing unit 703 may detect the occurrence of pressurization (for example, a touch, transformation, etc.) applied to the display apparatus and the location of the pressurization. The sensing unit 703 may transfer the measured resistance change of the pressure resistance layer to the controller 90, and the controller 90 may detect the occurrence and location of pressurization. In the case of a pixel PX1 illustrated in FIG. 5, the sensing unit 703 may detect the occurrence and location of pressurization based on the resistance change of active layers of the first transistor T1 and the second transistor T2, which configure a pressure sensor SEN. The sensing unit 703 may include a single amplifying circuit, a plurality of amplifying circuits, an analog-digital converter (ADC), a noise removing circuit, etc.

The data driver 705 is connected to the plurality of data lines DL1 to DLm of the pixel unit 10 via the second switching unit 701 during the display mode. The data driver 705 supplies a data signal Data to a pixel PX via the plurality of data lines DL1 to DLm in response to a data control signal DCS, included in the third control signal CS3, from the controller 90. The data driver 705 converts input image data DATA having a grayscale input from the controller 90 into a data signal Data in the form of a voltage or a current.

An embodiment of FIG. 7 illustrates an example of selectively applying a sensing input signal Tx to the plurality of initialization lines IL1 to ILm. However, the embodiment is not limited thereto, and in the case where sensing input signals Tx are collectively applied to the plurality of initialization lines IL1 to ILm, the first switching unit 501 may be omitted. In this case, while an initialization signal Vsus is applied, a sensing input signal Tx may not be applied, and while the sensing input signal Tx is applied, the initialization signal Vsus may not be applied.

Figure 8A:
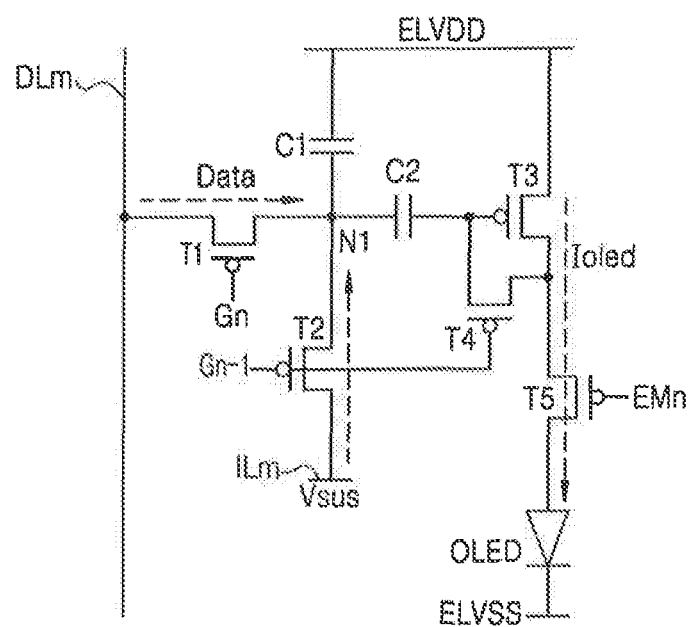
FIG. 8A is a circuit diagram illustrating driving of a pixel illustrated in FIG. 5 during a display mode.
Figure 8B:
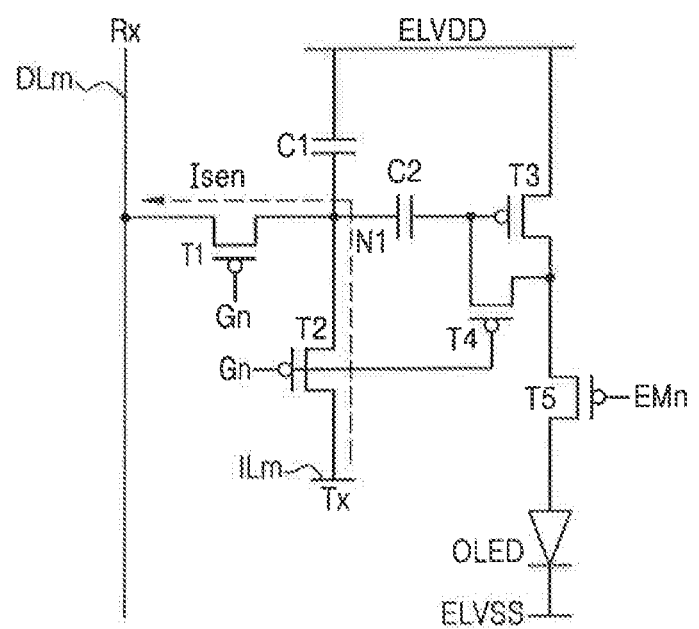
FIG. 8B is a circuit diagram illustrating driving of a pixel illustrated in FIG. 5 during a sensing mode.

FIG. 8A is a circuit diagram illustrating driving of a pixel (illustrated in FIG. 5) during a display mode, and FIG. 8B is a circuit diagram illustrating driving of a pixel (illustrated in FIG. 5) during a sensing mode.

Referring to FIGS. 7 and 8A together, during the display mode, the first switching unit 501 connects the plurality of initialization lines IL1 to ILm to the second input line 505, and the second switching unit 701 connects the plurality of data lines DL1 to DLm to the data driver 705.

During one frame, the pixel PX1 is driven in an initialization and threshold voltage compensation section, a data write section, and an emission section.

When a scan signal Gn−1 is transferred from a second scan line GLn−1 during the initialization and threshold voltage compensation section, a second transistor T2 and a fourth transistor T4 are turned on. A third transistor T3 is diode-connected by the activation of the fourth transistor T4. Accordingly, an initialization signal Vsus from the initialization line ILm is applied to a first node N1, and a compensation voltage corresponding to a threshold voltage of the third transistor T3 is stored in a second capacitor C2.

When a scan signal Gn is applied from a first scan line GLn during the data write section, a first transistor T1 is turned on. Accordingly, a data signal Data is applied to a first node N1, and a voltage corresponding to the data signal Data is stored in a first capacitor C1.

When an emission control signal EMn is applied to an emission control line ELn during the emission section, a fifth transistor T5 is turned on. Accordingly, a first current path, which starts from a power line ELVDDL supplying a first power voltage ELVDD and passes through the third transistor T3 and the fifth transistor T5, is formed, and a driving current $I_{oled}$ flows through the first current path. The OLED emits light at brightness corresponding to the driving current $I_{oled}$.

Referring to FIGS. 7 and 8B together, during the sensing mode, the first switching unit 501 connects the plurality of initialization lines IL1 to ILm to the first input line 503, and the second switching unit 701 connects the plurality of data lines DL1 to DLm to the sensing unit 703.

During the sensing mode, the pixel PX1 uses a pair of signal lines connected to the pixel PX1 as a transmission terminal and a reception terminal, and operates as a pressure sensor, including LTPS transistors, between the transmission terminal and the reception terminal. When a sensing input signal Tx is input to the transmission terminal, a second current path is formed between the transmission terminal and the reception terminal, and a sensing current $I_{sen}$ flowing through the second current path is output as a sensing output signal Rx from the reception terminal. An embodiment of FIG. 8B illustrates an example that implements a pressure sensor that uses the transmission terminal as an initialization line ILm and uses the reception terminal as a data line DLm.

When a scan signal Gn is applied from the first scan line GLn and the second scan line GLn−1 during the sensing mode, a first transistor T1 and a second transistor T2 are turned on. Also, a sensing input signal Tx is applied from the initialization line ILm, and a second current path, which starts from the initialization line ILm and passes through the second transistor T2 and the first transistor T1, is formed. A sensing output signal Rx corresponding to a sensing current $I_{sen}$ flowing through the second current path is output to the sensing unit 703 via the data line DLm.

Since display mode and sensing mode operation timings of the pixel PX1 are substantially the same as those illustrated in FIGS. 3 and 4, descriptions thereof are omitted.

Figure 9:
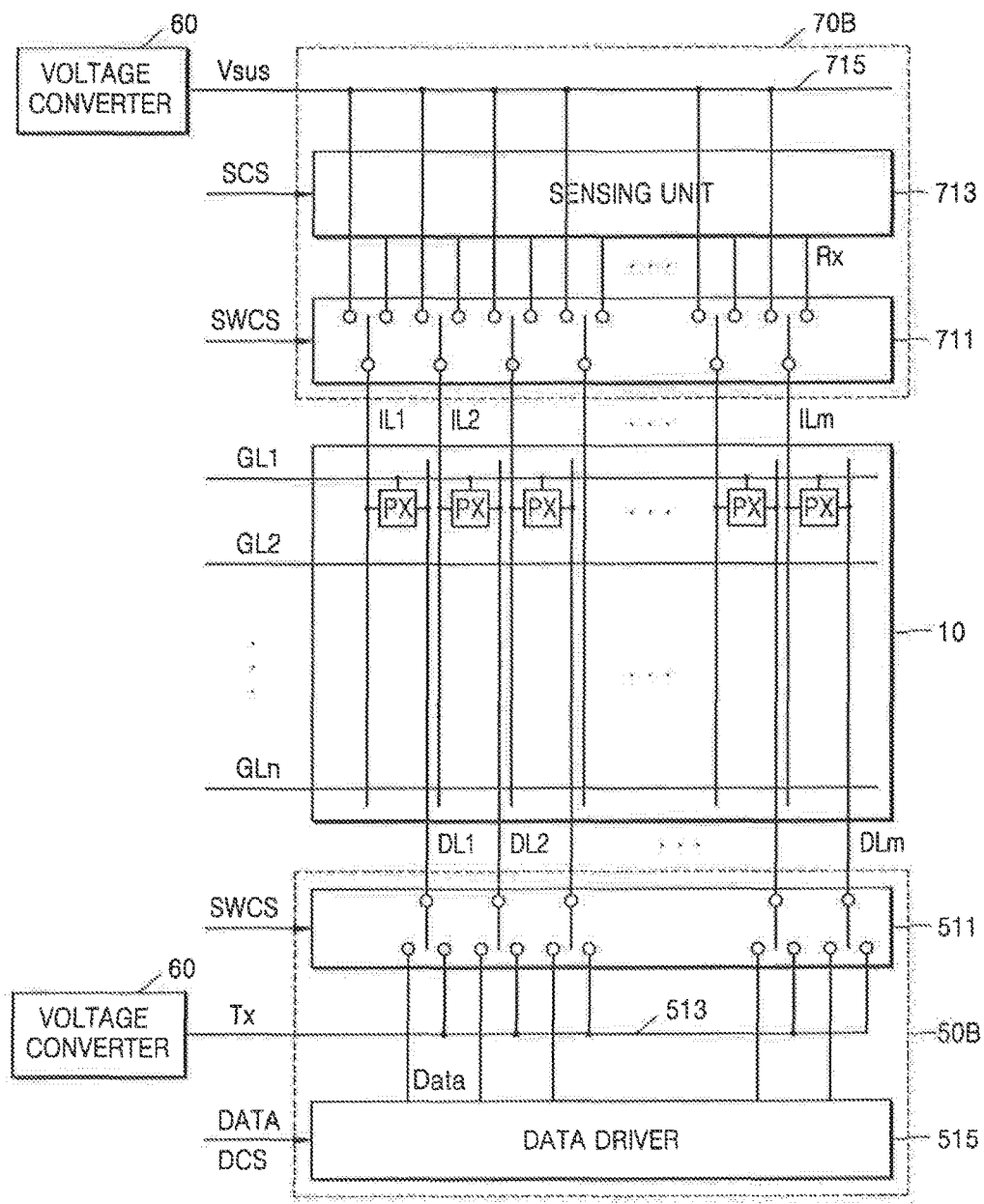
FIG. 9 is a block diagram illustrating another example of a panel driving and output unit and a panel driving and sensing unit illustrated in FIG. 1.

FIG. 9 is a block diagram illustrating another example of the panel driving and output unit and the panel driving and sensing unit illustrated in FIG. 1.

In an embodiment of FIG. 9, the plurality of first signal lines SL11 to SL1m, illustrated in FIG. 1, are a plurality of initialization lines IL1 to ILm, and the plurality of second signals SL21 to SL2m are a plurality of data lines DL1 to DLm transferring a data signal.

A panel driving and output unit 50B includes a first switching unit 511, a first input line 513 transferring a sensing input signal Tx, and a data driver 515.

The first switching unit 511 includes a plurality of switches selectively connecting the plurality of data lines DL1 to DLm to the first input line 513 and the data driver 515. Each switch may be implemented by using at least one transistor. The first switching unit 511 may individually control each switch by using a switch control signal SWCS, included in a second control signal CS2, from the controller 90. The first switching unit 511 connects the plurality of data lines DL1 to DLm to the data driver 515 during the display mode, and connects the plurality of data lines DL1 to DLm to the first input line 513 during the sensing mode. During the sensing mode, the first switching unit 511 may connect only some of the plurality of data lines DL1 to DLm to the first input line 513.

According to an exemplary embodiment, during the sensing mode, the first input line 513 is connected to the plurality of data lines DL1 to DLm of the pixel unit 10 via the first switching unit 511. The first input line 513 applies a sensing input signal Tx to the plurality of data lines DL1 to DLm of the pixel unit 10. The sensing input signal Tx may be supplied from a voltage converter 60. The voltage converter 60 may be provided in the controller 90. However, the embodiment is not limited thereto, and the voltage converter 60 may be provided in the panel driving and output unit 50B.

During the display mode, the data driver 515 may be connected to the plurality of data lines DL1 to DLm of the pixel unit 10 via the first switching unit 511. The data driver 515 supplies a data signal Data to a pixel PX via the plurality of data lines DL1 to DLm in response to a data control signal DCS included in a third control signal CS3 from the controller 90. The data driver 515 converts input image data DATA having a grayscale input from the controller 90 into a data signal Data in the form of a voltage or a current.

A panel driving and sensing unit 70B includes a second switching unit 711, a sensing unit 713, and a second input line 715 transferring an initialization signal Vsus.

The second switching unit 711 includes a plurality of switches selectively connecting the plurality of initialization lines IL1 to ILm to the sensing unit 713 and the second input line 715. Each switch may be implemented by using at least one transistor. The second switching unit 711 connects the plurality of initialization lines IL1 to ILm to the second input line 715 during the display mode, and connects the plurality of initialization lines IL1 to ILm to the sensing unit 713 during the sensing mode in response to a switch control signal SWCS, included in a third control signal CS3, from the controller 90. During the sensing mode, the second switching unit 711 may connect only some of the plurality of data lines DL1 to DLm to the sensing unit 713.

The sensing unit 713 is connected to the plurality of initialization lines IL1 to ILm of the pixel unit 10 via the second switching unit 711 during the sensing mode. The sensing unit 713 receives a sensing output signal Rx from the pixel unit 10 via the plurality of initialization lines IL1 to ILm. The sensing unit 713 is a circuit that detects a current flowing through a pixel PX when the pixel PX operates in the sensing mode in response to a sensing control signal SCS, included in a third control signal CS3, from the controller 90. A current detected by the sensing unit 713 corresponds to a resistance value of a pressure resistance layer of a transistor disposed along a current path formed in the pixel PX. The sensing unit 713 may detect whether pressurization (for example, a touch, transformation, etc.) is applied to the display apparatus and where the pressurization is located by measuring the resistance change of a pressure resistance layer from a sensing output signal Rx. The sensing unit 713 may transfer the measured resistance change of the pressure resistance layer to the controller 90, and the controller 90 may detect the occurrence and location of pressurization. In the case of a pixel PX1 illustrated in FIG. 5, the sensing unit 713 may detect the occurrence and location of pressurization based on the resistance change of active layers of the first transistor T1 and the second transistor T2, which configure a pressure sensor SEN. The sensing unit 713 may include a single amplifying circuit, a plurality of amplifying circuits, an analog-digital converter (ADC), a noise removing circuit, etc.

The second input line 715 is connected to the plurality of initialization lines IL1 to ILm of the pixel unit 10 via the second switching unit 711. The second input line 715 applies an initialization signal Vsus to the plurality of initialization lines IL1 to ILm of the pixel unit 10. The initialization signal Vsus may be supplied from the voltage converter 60. According to an exemplary embodiment, the voltage converter 60 may be provided in the controller 90. However, the embodiment is not limited thereto, and the voltage converter 60 may be provided in the panel driving and sensing unit 70B.

During the display mode, driving of the pixel PX1 is substantially the same as that illustrated in FIG. 8A.

Referring to FIGS. 9 and 8A together, during the display mode, the first switching unit 511 connects the plurality of data lines DL1 to DLm to the data driver 515, and the second switching unit 711 connects the plurality of initialization lines IL1 to ILm to the second input line 715.

The pixel PX1 is driven in an initialization and threshold voltage compensation section, a data write section, and an emission section during one frame. Since the driving is substantially the same as that illustrated in FIG. 8A, description thereof is omitted.

Figure 10:
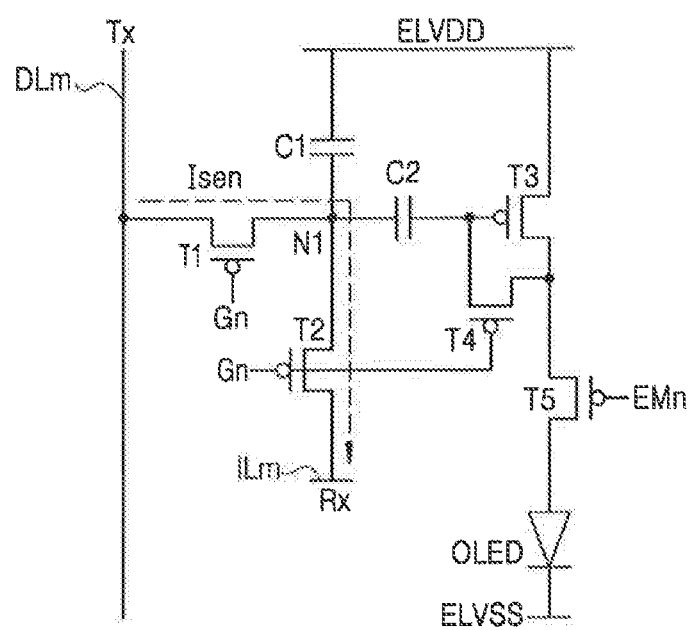
FIG. 10 is a circuit diagram illustrating driving of a pixel illustrated in FIG. 5 during a sensing mode.

FIG. 10 is a circuit diagram illustrating driving of a pixel PX1, illustrated in FIG. 5, during a sensing mode.

Referring to FIGS. 9 and 10 together, during the sensing mode, the first switching unit 511 connects the plurality of data lines DL1 to DLm to the first input line 513, and the second switching unit 711 connects the plurality of initialization lines IL1 to ILm to the sensing unit 713.

During the sensing mode, the pixel PX1 uses a pair of signal lines connected to a pixel PX as a transmission terminal and a reception terminal, and operates as a pressure sensor, including LTPS transistors, between the transmission terminal and the reception terminal. When a sensing input signal Tx is input to the transmission terminal, a second current path is formed between the transmission terminal and the reception terminal, and a sensing current $I_{sen}$ flowing through the second current path is output as a sensing output signal Rx from the reception terminal. An embodiment of FIG. 10 illustrates an example that implements a pressure sensor using the transmission terminal as a data line DLm and the reception terminal as an initialization line ILm.

When a scan signal Gn is applied from a first scan line GLn and a second scan line GLn−1 during the sensing mode, a first transistor T1 and a second transistor T2 are turned on. Also, a sensing input signal Tx is applied from the data line DLm, and a second current path, which starts from the data line DLm and passes through the first transistor T1 and the second transistor T2, is formed. A sensing output signal Rx corresponding to a sensing current $I_{sen}$ flowing through the second current path is output to the sensing unit 713 via the initialization line ILm.

Since display mode and sensing mode operation timings of the pixel PX1 are substantially the same as those illustrated in FIGS. 3 and 4, descriptions thereof are omitted.

Figure 11:
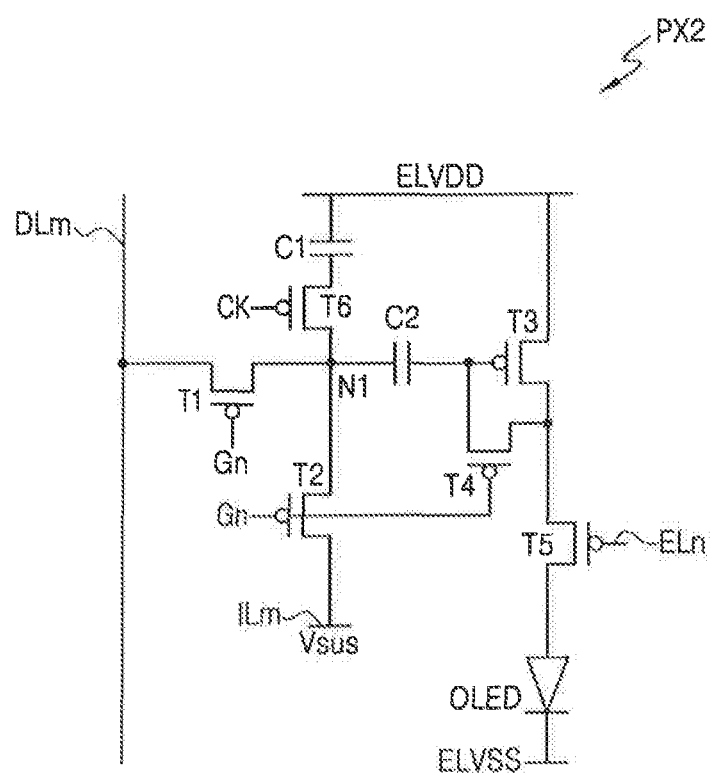
FIG. 11 is a circuit diagram illustrating an example of a pixel according to an embodiment.

FIG. 11 is a circuit diagram illustrating an example of a pixel according to an exemplary embodiment.

FIG. 11 illustrates a pixel PX2 connected to an n-th scan line GLn and an m-th data line DLm, for convenience of description.

The pixel PX2 is substantially the same as the pixel PX1 illustrated in FIG. 5, except a sixth transistor T6 is added.

The pixel PX2 includes a pixel circuit PC and a light-emitting device (OLED).

The pixel circuit PC includes first to sixth transistors T1 to T6 and first and second capacitors C1 and C2.

The sixth transistor T6 includes a gate electrode to which a gate electrode control signal CK is applied, a first electrode connected to the first capacitor C1, and a second electrode connected to a first node N1.

Even though the driving mode of the pixel is divided into the display mode and the sensing mode via time division driving, as a voltage is applied to the pixel circuit to drive a pressure sensor, the first capacitor C1 storing a voltage corresponding to a data signal may be influenced by a current flowing through the pixel circuit. Accordingly, when the pixel is driven in the display mode, the driving current changes and thus influences image quality.

According to the embodiment, the sixth transistor T6 separating the pressure sensor from the pixel circuit during the sensing mode is inserted between the first node N1 and the first capacitor C1 on the second current path. The sixth transistor T6 is turned on during the display mode and turned off during the sensing mode.

Since operation of the pixel PX2 illustrated in FIG. 11 during the display mode and the sensing mode are substantially the same as described above, detailed descriptions thereof are omitted.

Figure 12:
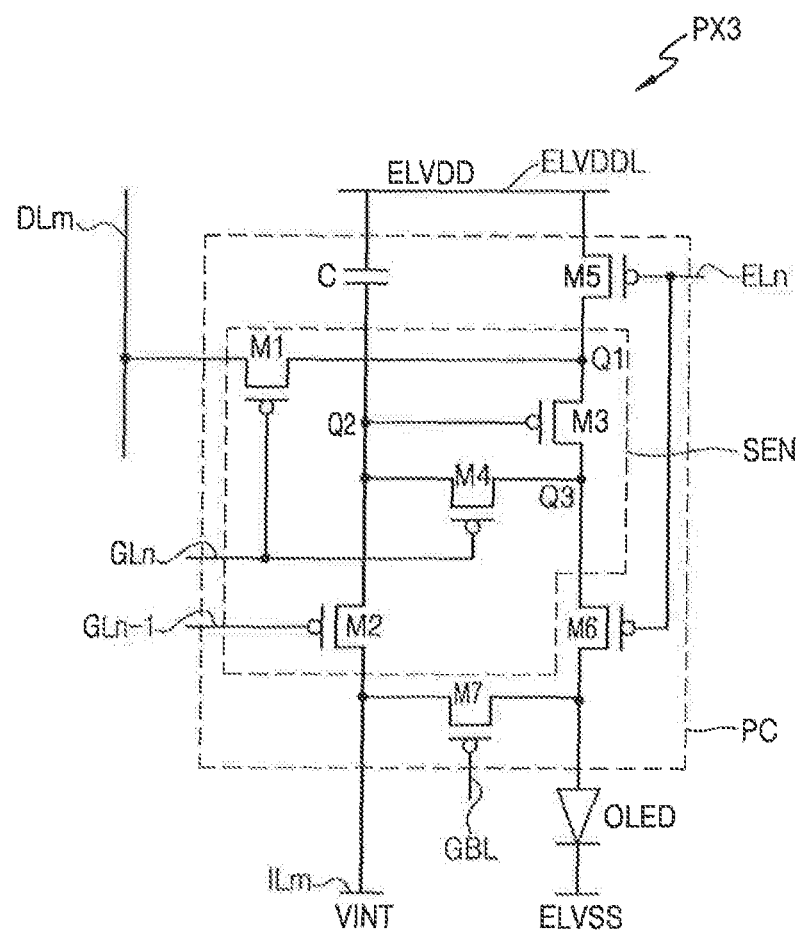
FIG. 12 is a circuit diagram illustrating an example of a pixel according to an embodiment.

FIG. 12 is a circuit diagram illustrating an example of a pixel according to an exemplary embodiment.

FIG. 12 illustrates a pixel connected to an n-th scan line GLn and an m-th data line DLm, for convenience of description. Referring to FIG. 12, a pixel PX3 includes a pixel circuit PC and a light-emitting device (OLED).

The OLED includes a first electrode connected to the pixel circuit PC and a second electrode connected to a power source supplying a second power voltage ELVSS. The OLED emits light at predetermined brightness in response to a driving current supplied from the pixel circuit PC.

The pixel circuit PC includes first to seventh transistors M1 to M7, and a capacitor C.

The first transistor M1 includes a gate electrode connected to a first scan line GLn, which is a scan line corresponding to an n-th pixel row, a first electrode connected to a data line DLm, and a second electrode connected to a first node Q1.

The second transistor M2 includes a gate electrode connected to a second scan line GLn−1, which is a scan line corresponding to an (n−1)-th pixel row before an n-th pixel row, a first electrode connected to an initialization line ILm transferring an initialization signal VINT, and a second electrode connected to a second node Q2.

The data line DLm may be a first signal line SL1, and the initialization line ILm may be a second signal line SL2. Alternatively, the data line DLm may be the second signal line SL2, and the initialization line ILm may be the first signal line SL1.

The third transistor M3 includes a gate electrode connected to the second node Q2, a first electrode connected to the first node Q1, and a second electrode connected to a third node Q3. The second electrode of the third transistor M3 is connected to the first electrode of the OLED via the sixth transistor M6.

The fourth transistor M4 includes a gate electrode connected to the first scan line GLn, a first electrode connected to the second electrode of the third transistor M3, and a second electrode connected to the gate electrode of the third transistor M3.

The fifth transistor M5 includes a gate electrode connected to an emission control line ELn, a first electrode connected to a power line ELVDDL, and a second electrode connected to the first node Q1.

The sixth transistor M6 includes a gate electrode connected to the emission control line ELn, a first electrode connected to the third node Q3, and a second electrode connected to the first electrode of the OLED.

The seventh transistor M7 includes a gate electrode connected to a bypass control line GBL, a first electrode connected to the second electrode of the sixth transistor M6 and the first electrode of the OLED, and a second electrode connected to the initialization line ILm. The bypass control line GBL may be the second scan line GLn−1 or a scan line GLn+1 of an (n+1)-th pixel row.

The capacitor C is connected between the second node Q2 and the power line ELVDDL. The capacitor C is charged with a voltage corresponding to a data signal.

The pixel circuit PC generates a driving current for light emission of the OLED via operation of the first to seventh transistors M1 to M7 and the capacitor C during the display mode. The pixel circuit PC operates as a pressure sensor SEN, which includes the first to fourth transistors M1 to M4 connected between a pair of signal lines, for example, the initialization line ILm and the data line DLm during the sensing mode.

According to an embodiment, the first to seventh transistors M1 to M7 are LTPS transistors including polysilicon, in which an active layer has a pressure resistance characteristic. Therefore, a current path is formed in which a sensing current is generated in the pixel circuit PC by using at least one of the first to seventh transistors M1 to M7, allowing the pixel circuit PC to perform sensing mode driving independently of display mode driving. The current path in which the sensing current is generated in the pixel circuit PC is different from a current path in which a driving current is generated in the pixel circuit PC.

Figure 13A:
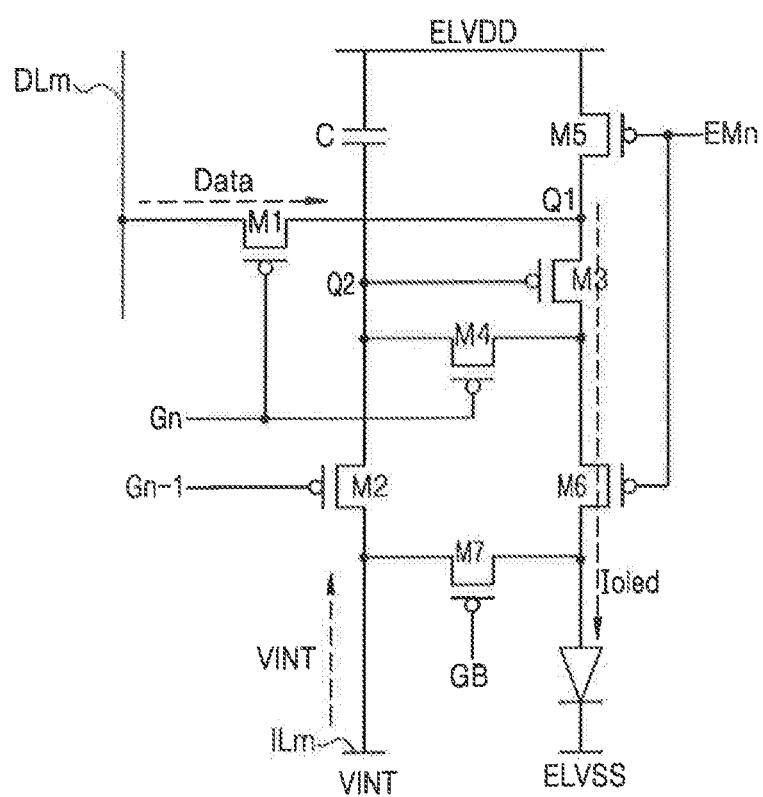
FIG. 13A is a circuit diagram illustrating driving of the pixel illustrated in FIG. 12 during the display mode.
Figure 13B:
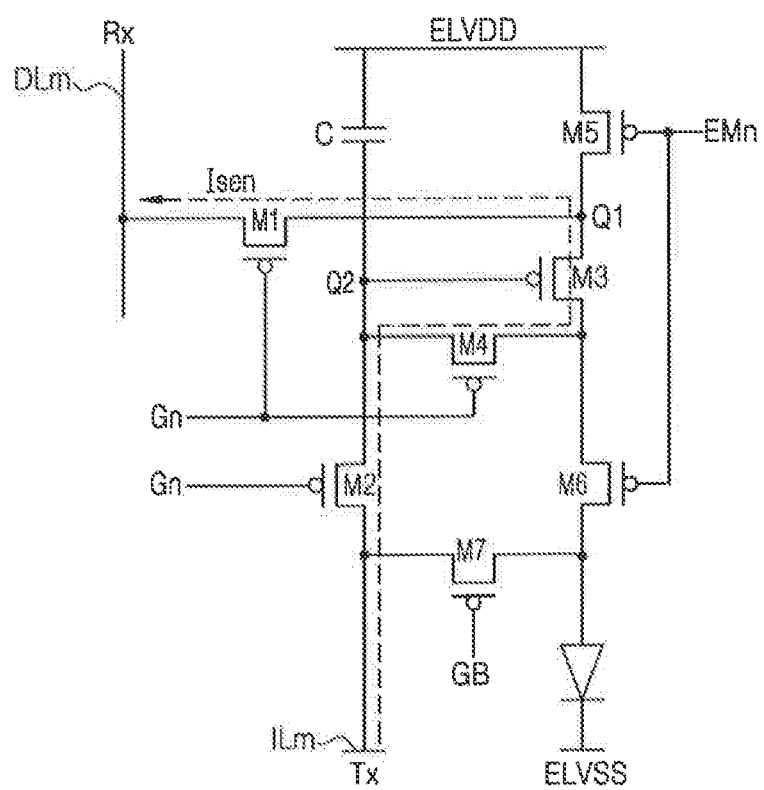
FIGS. 13B and 13C are circuit diagrams illustrating driving of the pixel illustrated in FIG. 12 during the sensing mode.
Figure 13C:
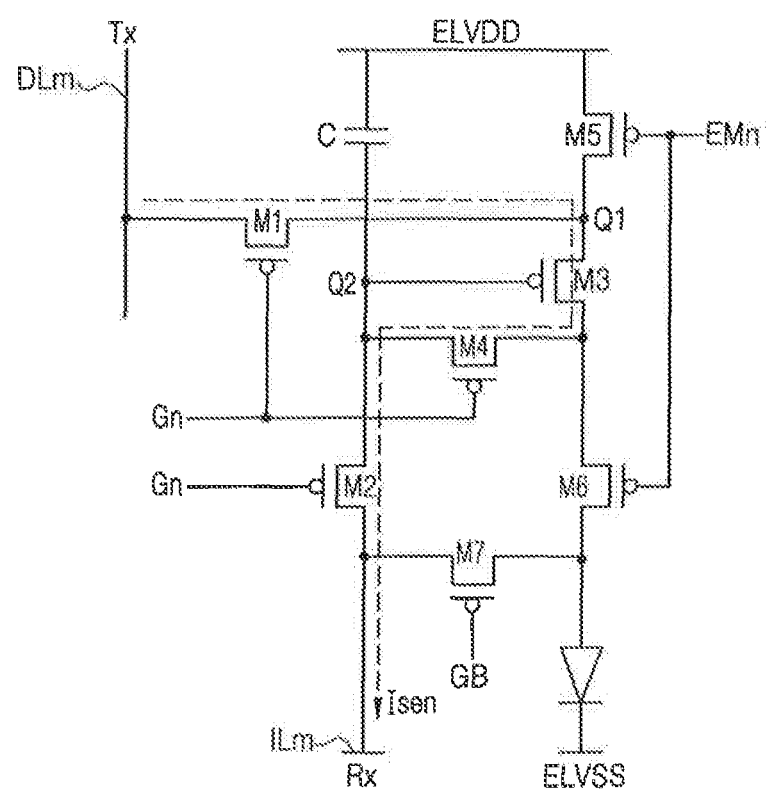

FIG. 13A is a circuit diagram illustrating driving of the pixel PX3 illustrated in FIG. 12 during the display mode, and FIGS. 13B and 13C are circuit diagrams illustrating driving of the pixel PX3 illustrated in FIG. 12 during the sensing mode.

In the embodiment of FIG. 7, during the display mode, the first switching unit 501 connects the plurality of initialization lines IL1 to ILm to the second input line 505, and the second switching unit 701 connects the plurality of data lines DL1 to DLm to the data driver 705.

In the embodiment of FIG. 9, during the display mode, the first switching unit 511 connects the plurality of data lines DL1 to DLm to the data driver 515, and the second switching unit 711 connects the plurality of initialization lines IL1 to ILm to the second input line 715.

Referring to FIG. 13A, during the display mode of the embodiment of FIG. 7 or 9, the pixel PX3 is driven in an initialization section, a data write section, and an emission section during one frame.

When a scan signal Gn−1 is transferred from the second scan line GLn−1 during the initialization section, the second transistor M2 is turned on. Accordingly, an initialization signal VINT from the initialization line ILm is applied to the second node Q2, and initializes the gate electrode of the third transistor M3.

When a scan signal Gn is transferred from the first scan line GLn during the data write section, the first transistor M1 and the fourth transistor M4 are turned on. By the activation of the fourth transistor M4, the third transistor M3 is diode-connected. Accordingly, a data signal Data is applied to the first node Q1, and by the data signal Data, a compensation voltage that compensates for a threshold voltage of the third transistor M3 is applied to the gate electrode of the third transistor M3. A charge corresponding to a voltage difference between both ends is stored in the capacitor C.

When an emission control signal EMn supplied from the emission control line ELn is applied during the emission section, the fifth transistor M5 and the sixth transistor M6 are turned on. Accordingly, a first current path, which starts from the power line ELVDDL supplying a first power voltage ELVDD and passes through the fifth transistor M5, the third transistor M3, and the sixth transistor M6, is formed, and a driving current $I_{oled}$ flows through the first current path. The OLED emits light at a brightness corresponding to the driving current $I_{oled}$.

Meanwhile, the pixel PX3 may receive a bypass control signal GB simultaneously with a scan signal Gn−1 from the second scan line GLn−1, or simultaneously with a scan signal Gn+1 from a scan line GLn+1 of an (n+1)-th pixel row. Accordingly, the seventh transistor M7 is turned on, and the first electrode of the OLED may be initialized by using the initialization voltage VINT.

During the sensing mode of the embodiment of FIG. 7, the first switching unit 501 connects the plurality of initialization lines IL1 to ILm to the first input line 503, and the second switching unit 701 connects the plurality of data lines DL1 to DLm to the sensing unit 703.

Referring to FIG. 13B, during the sensing mode, the pixel PX3 uses a pair of signal lines connected to the pixel PX3 as a transmission terminal and a reception terminal, and operates as a pressure sensor, including LTPS transistors, between the transmission terminal and the reception terminal. When a sensing input signal Tx is input to the transmission terminal, a second current path is formed between the transmission terminal and the reception terminal, and a sensing current $I_{sen}$ flowing through the second current path is output as a sensing output signal Rx from the reception terminal. The embodiment of FIG. 13B illustrates an example that implements a pressure sensor using the transmission terminal as an initialization line ILm and the reception terminal as a data line DLm.

When scan signals Gn are simultaneously applied from the first scan line GLn and the second scan line GLn−1 during the sensing mode, the first transistor M1, the second transistor M2, and the third transistor M3 are turned on. Also, a sensing input signal Tx is applied from the initialization line ILm, so that a second current path that starts from the initialization line ILm and passes through the second transistor M2, the fourth transistor M4, the third transistor M3, and the first transistor M1 is formed. A sensing output signal Rx, corresponding to a sensing current $I_{sen}$ flowing through the second current path, is output to the sensing unit 703 via the data line DLm.

During the sensing mode of the embodiment of FIG. 9, the first switching unit 511 connects the plurality of data lines DL1 to DLm to the first input line 513, and the second switching unit 711 connects the plurality of initialization lines IL1 to ILm to the sensing unit 713.

Referring to FIG. 13C, during the sensing mode, the pixel PX3 uses a pair of signal lines connected to the pixel PX3 as a transmission terminal and a reception terminal, and operates as a pressure sensor, including LTPS transistors, between the transmission terminal and the reception terminal. When a sensing input signal Tx is input to the transmission terminal, a second current path is formed between the transmission terminal and the reception terminal, and a sensing current $I_{sen}$ flowing through the second current path is output as a sensing output signal Rx from the reception terminal. The embodiment of FIG. 13C illustrates an example that implements a pressure sensor using the transmission terminal as a data line DLm and the reception terminal as an initialization line ILm.

When a scan signal Gn is applied from the first scan line GLn and the second scan line GLn−1 during the sensing mode, the first transistor M1, the second transistor M2, and the third transistor M3 are turned on. Also, a sensing input signal Tx is applied from the data line DLm, and a second current path, which starts from the data line DLm and passes through the first transistor M1, the third transistor M3, the fourth transistor M4, and the second transistor M2, is formed. A sensing output signal Rx corresponding to a sensing current $I_{sen}$ flowing through the second current path is output to the sensing unit 713 via the initialization line DLm.

Figure 14:
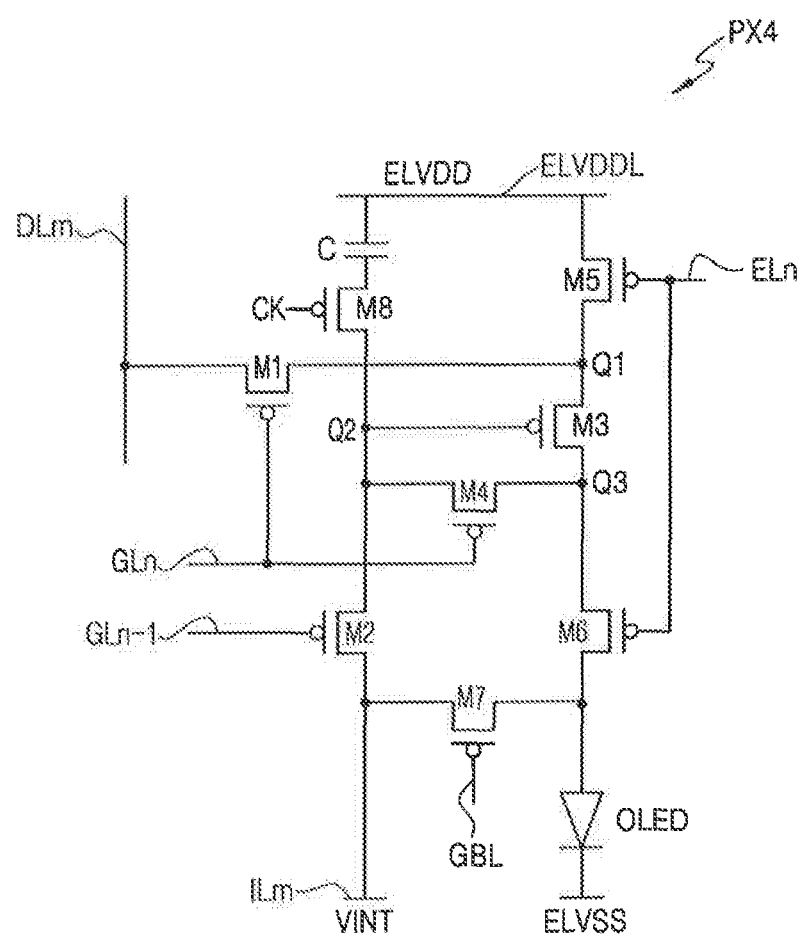
FIG. 14 is a circuit diagram illustrating an example of a pixel according to an embodiment.

FIG. 14 is a circuit diagram illustrating an example of a pixel PX4 according to an exemplary embodiment.

FIG. 14 illustrates a pixel PX4 connected to an n-th scan line GLn and an m-th data line DLm, for convenience of description.

The pixel PX4 is substantially the same as pixel PX3 illustrated in FIG. 12, except an eighth transistor M8 is added.

The pixel PX4 includes the pixel circuit PC and the OLED.

The pixel circuit PC includes the first to eight transistors M1 to M8 and the capacitor C.

The eighth transistor M8 includes a gate electrode to which a gate electrode control signal CK is applied, a first electrode connected to the capacitor C, and a second electrode connected to a second node Q2.

Even though the driving mode of the pixel is divided into the display mode and the sensing mode via time division driving, as a voltage is applied to the pixel circuit to drive a pressure sensor, the capacitor storing a voltage corresponding to a data signal may be influenced by the current flowing through the pixel circuit. Accordingly, when the pixel is driven in the display mode, the driving current changes and thus influences image quality.

According to the embodiment, the eighth transistor M8 separating the pressure sensor from the pixel circuit during the sensing mode is inserted between the second node Q2 and the capacitor C on the second current path. The eighth transistor M8 is turned on during the display mode, and turned off during the sensing mode.

Since operation of the pixel PX4 illustrated in FIG. 14 during the display mode and the sensing mode are substantially the same as described above, descriptions thereof are omitted.

The display apparatus according to exemplary embodiments may drive a pixel as a pressure sensor at predetermined timing by using a polysilicon-based transistor to configure a pixel circuit of the pixel without inserting a separate sensor into the pixel. Therefore, process costs arising from the addition of a sensor may be reduced. A pressure sensor according to the exemplary embodiments may reduce electrostatic noise via a shielding effect by a gate electrode of a transistor.

Embodiments may operate a pixel as a pressure sensor by simultaneously applying scan signals to gates of specific transistors from among a plurality of transistors inside a pixel circuit and turning on the specific transistors, and detecting a current in a section in which a current flowing through a channel (a region between a source and a drain) of a transistor is linear.

Though exemplary embodiments implement a pressure sensor that forms a path along which a sensing current may flow between a data line DL and an initialization line IL, the embodiments are not limited thereto, and the pressure sensor may be implemented by using a polysilicon-based transistor between an arbitrary pair of signal lines in which a current path may be formed in a pixel circuit depending on pixel structure. One pair of signal lines may serve as a transmission terminal and the other may serve as a reception terminal.

Though the inventive concept has been described with reference to exemplary embodiments illustrated in the drawings, these are provided for an exemplary purpose only, and one of ordinary skill in the art will understand that various modifications and other equivalent embodiments may be made therein. Therefore, the spirit and scope of the inventive concept should be defined by the following claims.

What is claimed is:

1. A display apparatus operating in a display mode or a sensing mode, the apparatus comprising:
    a first signal line configured to apply a first driving signal to a pixel circuit during the display mode and to apply a sensing input signal to the pixel circuit during the sensing mode;
    a second signal line configured to apply a second driving signal to the pixel circuit during the display mode and to transmit a sensing output signal generated from the pixel circuit during the sensing mode; and
    a pixel comprising the pixel circuit, wherein a first current path for image display is formed in the pixel circuit during the display mode, and a second current path, configured to measure a resistance of a pressure resistance layer between the first signal line and the second signal line, is formed in the pixel circuit during the sensing mode.

2. The apparatus of claim 1, wherein the pressure resistance layer comprises polysilicon.

3. The apparatus of claim 1, wherein the first signal line comprises one of an initialization line, configured to apply a signal initializing a gate electrode of a transistor of the pixel circuit, and a data line, configured to apply a data signal to the pixel circuit during the display mode, and the second signal line comprises the other of the initialization line and the data line.

4. The apparatus of claim 1, wherein the pixel circuit comprises:
    a first transistor connected to the first signal line and a first scan line; and
    a second transistor connected to the second signal line and a second scan line,
    wherein the first transistor and the second transistor are turned on by a scan signal applied to both the first scan line and the second scan line, such that the second current path is formed between the first signal line and the second signal line during the sensing mode.

5. The apparatus of claim 4, wherein
    the first transistor comprises:
    a first gate electrode connected to the first scan line, a first electrode connected to the first signal line, a second electrode connected to a first node, and a first pressure resistance layer connected to the first electrode and the second electrode; and
    the second transistor comprises:
    a second gate electrode connected to the second scan line, a third electrode connected to the second signal line, a fourth electrode connected to the first node, and a second pressure resistance layer connected to the third electrode and the fourth electrode.

6. The apparatus of claim 4, wherein the pixel circuit further comprises:
    a third transistor connected between one node of the second current path and a capacitor storing a voltage corresponding to a data signal,
    wherein the third transistor is turned on during the display mode and turned off during the sensing mode.

7. The apparatus of claim 4, wherein the pixel circuit further comprises:
    at least one transistor connected to the first scan line or the second scan line and connected between the first transistor and the second transistor, and
    the at least one transistor is turned on with the first transistor and the second transistor by the scan signal applied to the first scan line and the second scan line, such that the second current path is formed between the first signal line and the second signal line during the sensing mode.

8. The apparatus of claim 7, wherein
    the first transistor comprises:
    a first gate electrode connected to the first scan line, a first electrode connected to the first signal line, a second electrode connected to a first node, and a first pressure resistance layer connected to the first electrode and the second electrode,
    the second transistor comprises:
    a second gate electrode connected to the second scan line, a third electrode connected to the second signal line, a fourth electrode connected to a second node, and a second pressure resistance layer connected to the third electrode and the fourth electrode, and
    the at least one transistor connected between the first transistor and the second transistor comprises:
    a third transistor comprising a third gate electrode connected to the first node, a fifth electrode connected to the second node, a sixth electrode, and a third pressure resistance layer connected to the fifth electrode and the sixth electrode; and
    a fourth transistor comprising a fourth gate electrode connected to the first scan line, a seventh electrode connected to the third gate electrode of the third transistor, an eighth electrode connected to the sixth electrode of the third transistor, and a fourth pressure resistance layer connected to the seventh electrode and the eighth electrode.

9. The apparatus of claim 1, wherein the sensing mode is performed during a blank section of one frame.

10. The apparatus of claim 1, wherein each of the display mode and the sensing mode is performed in one of an even-numbered frame and an odd-numbered frame, and the display mode and the sensing mode alternate.

11. The apparatus of claim 1, further comprising:
    a scan driver configured to apply a scan signal to a scan line connected to the pixel circuit during the display mode and the sensing mode;
    a panel driving and output unit configured to apply the first driving signal to the first signal line during the display mode and to apply the sensing input signal to the first signal line during the sensing mode; and
    a panel driving and sensing unit configured to apply the second driving signal to the second signal line during the display mode, to read out the sensing output signal from the second signal line during the sensing mode, and to measure a resistance change of the pressure resistance layer during the sensing mode.

12. The apparatus of claim 11, wherein the scan driver comprises:
    a first scan driver configured to apply the scan signal to the scan line during the display mode; and a second scan driver configured to apply the scan signal to the scan line during the sensing mode.

13. The apparatus of claim 11, wherein the first signal line comprises an initialization line applying an initialization signal, and the second signal line comprises a data line applying a data signal,
the panel driving and output unit comprises a first switching unit configured to connect the initialization line to a first input line supplying the initialization signal during the display mode, and to connect the initialization line to a second input line supplying the sensing input signal during the sensing mode, and
the panel driving and sensing unit comprises:
a data driver supplying the data signal to the data line during the display mode;
a sensing unit reading out the sensing output signal via the data line during the sensing mode; and
a second switching unit selectively connecting the data line to the data driver and the sensing unit, depending on a driving mode.

14. The apparatus of claim 11, wherein the first signal line comprises a data line applying a data signal, and the second signal line comprises an initialization line applying an initialization signal,
the panel driving and output unit comprises:
a data driver configured to supply the data signal to the data line during the display mode; and
a first switching unit configured to connect the data line to the data driver during the display mode and to connect the data line to a first input line supplying the sensing input signal during the sensing mode; and
the panel driving and sensing unit comprises:
a sensing unit reading out the sensing output signal via the initialization line during the sensing mode; and
a second switching unit configured to connect the initialization line to a second input line supplying the initialization signal during the display mode, and to connect the initialization line to the sensing unit during the sensing mode.

15. The apparatus of claim 11, wherein the scan driver simultaneously applies scan signals every N scan lines, N being greater than or equal to two.

16. A method of driving a display apparatus comprising a plurality of pixels, each of the pixels having a pixel circuit and a pressure resistance layer, the method comprising:
receiving a scan signal;
receiving a data signal during a display mode;
emitting light by using a driving current during the display mode;
receiving a sensing input signal during a sensing mode; and
generating a sensing output signal during the sensing mode,
wherein the driving current corresponds to the data signal and flows along a first current path formed in the pixel circuit during the display mode, and
wherein the sensing output signal corresponds to a resistance of the pressure resistance layer and flows along a second current path formed between a pair of signal lines connected to the pixel circuit during the sensing mode.

17. The method of claim 16, further comprising:
receiving the sensing output signal at a sensing unit; and
measuring a resistance change of the pressure resistance layer from the sensing output signal.

18. The method of claim 16, wherein scan signals are simultaneously applied to pixels arranged in a plurality of rows during the sensing mode, each row of pixels having a common scan line.

19. The method of claim 16, wherein the sensing mode is performed during a blank section of one frame.

20. The method of claim 16, wherein each of the display mode and the sensing mode is performed in one of an even-numbered frame and an odd-numbered frame, and the display mode and the sensing mode alternate.

* * * * *